3,073,805
CROSS-LINKED OLEFIN-MALEIC ANHYDRIDE
INTERPOLYMERS
Raymond H. Reinhard, Galveston, Tex., assignor to Monsanto Chemical Company, St. Louis, Mo., a corporation of Delaware
No Drawing. Filed Nov. 23, 1959, Ser. No. 854,538
6 Claims. (Cl. 260—78.5)

The present invention relates to cross-linked interpolymers of $C_2$—$C_4$ olefins with 1,2-diacarboxylic acids or their anhydrides and salts thereof. More particularly, it relates to interpolymers of ethylene, propylene, and butylenes with maleic anhydride cross-linked with diallyl ether and alkali and ammonium salts thereof.

Many cross-linking agents have been disclosed for use in the production of interpolymers from carboxylic monomers and olefinic compounds. A list of a number of suitable compounds for use in cross-linking styrene-maleic anhydride copolymers, for example, has been given in U.S. Patent 2,647,886. While it might be expected that such agents as are disclosed for styrene-containing polymers should be equally suitable for cross-linking olefin-containing polymers such as ethylene-maleic anhydride copolymers, this has not proven to be the case. Divinylbenzene, for example, which is an excellent cross-linking agent for styrene-maleic anhydride comonomers as demonstrated in the aforementioned patent, gives no appreciable cross-linking with either ethylene and maleic anhydride or propylene and maleic anhydride copolymers. Ethylene glycol dimethacrylate likewise does not cross-link the polymers with which the present invention is concerned whereas it is also disclosed as being an effective cross-linking agent for styrene-maleic anhydride copolymers.

Even in instances where some cross-linking may be effected by certain of the cross-linking agents known to be suitable in other systems, the resulting polymeric product is not useful in a given application. Cross-linked polymers of olefins such as ethylene, propylene and the like with maleic anhydride, for example, find extensive use when dispersed in water as viscosity control agents. They act as bodying or thickening agents in the preparation of textile printing pastes, surgical jellies, creams, and the like, as stabilizers for detergents, and as clay beneficiating agents useful in the preparation of drilling muds and other compositions. Such interpolymers generally in the form of gels must be hydrolytically stable, however, so that their viscosity does not decrease upon standing or else they are useless in these particular applications. Many of the known cross-linking agents are deficient because they result in interpolymers which are unstable products, i.e., products which have the serious disadvantage of being readily hydrolyzed in water particularly in the presence of alkalies such as are usually present in the mixtures in which they are useful. Such hydrolysis results in solution of the interpolymers upon standing with a steady break-down in viscosity even to the extent that the final solution is about the equivalent of the unmodified copolymer. Examples of such ineffective cross-linking agents include vinyl allyl ether, triallyl cyanurate, triallyl isocyanurate, diallyl cyanamide, divinyl carbitol, divinyl sulfone, diallyl maleate and diallyl sebacate among others. In view of these facts, it is most surprising that, as has now been discovered, diallyl ether can be used as a cross-linking agent for copolymers of olefins and maleic anhydride to produce interpolymers which are stable to hydrolysis so that they are eminently useful as viscosity control agents. Another advantage of this particular cross-linking agent lies in the fact that it provides cross-linked polymers of relatively low molecular weight which are very difficult to obtain with other cross-linking agents such as diesters, for instance.

Broadly, the invention comprises reacting $C_2$—$C_4$ olefins with 1,2-dicarboxylic acids or their anhydrides in the presence of diallyl ether as a cross-linking agent. The dicarboxylic acids can be maleic acid, fumaric acid, the mono- or dichlorosubstituted maleic and fumaric acids, alkylated maleic and fumaric acids, mono- and diphenyl maleic acids, benzyl maleic acid, dibenzyl maleic acid, ethyl maleic acid or any similar acids containing a double bond in the chain between the carboxyl groups such as mesaconic and citraconic acids. Acids where the double bond has shifted from the 1,2-position such as itaconic and glutaconic acids can also be used. Preferably, however, the anhydride of each of the above-mentioned acids capable of anhydride formation is employed rather than the acids.

More specifically, the interpolymers of the invention are formed by polymerizing a monomeric mixture of maleic anhydride with a $C_2$—$C_4$ olefin, i.e., ethylene, propylene, n-butylene and isobutylene, or olefin mixture using diallyl ether as a cross-linking agent. The amount of diallyl ether employed depends to some extent upon the olefin employed but generally lies in the range between 0.1 and 5.0% by weight of the total polymerizable mixture. When ethylene is a comonomer, for example, the amount of diallyl ether added should not exceed about 3.0% in order that the heteropolymer produced will have the required viscosity when dispersed in water to function as a thickener or viscosity control agent. With the higher olefins, the amount of the cross-linking ether can be increased up to the 5% level if desired. Amounts in excess of those specified usually result in the diallyl ether function as a chain-transfer agent in the polymerization rather than as a cross-linking agent.

The polymerization is carried out in an inert organic solvent, preferably a non-polymerizing hydrocarbon solvent, having solvating action on both the monomers and the cross-linking agent but which has little appreciable solvent or swelling action on the cross-linked heteropolymer produced. In this way, the polymer is obtained in the form of a fine powder which only requires freeing from solvent before use. Suitable solvents include, for example, ethylene dichloride, ethyl acetate, dioxane and, particularly, aromatic hydrocarbons such as benzene, toluene and xylene.

The olefin and anhydride are ordinarily charged in the equimolar proportions in which they react although variations can be made in the actual proportions used. The monomers and cross-linking agent are preferably dissolved in an amount of solvent such that the solids content of the reaction slurry formed is about 18%. This ordinarily represents an amount of solvent about six times the total weight of the compounds to be polymerized. The amount of solvent is not critical, however, and proportions of solvent as much as 10 or 20 times the weight of the olefin and maleic anhydride may be used. Alternatively, the diallyl ether cross-linking agent may be added to the mixture of anhydride and olefin during the course of the polymerization either over part or all of the polymerization period. The resulting solution is mixed thoroughly and heated sufficiently so that the polymerization reaction takes place.

An organic solvent-soluble catalyst is necessary. Any of the organic free-radical-catalysts is satisfactory. Among these are various organic solvent-soluble peroxygen compounds including benzoyl peroxide, caprylyl peroxide, acetyl peroxide, acetyl benzoyl peroxide, di-tert-butyl peroxide and others, azoisobutyronitrile, dimethyl azoisobutyrate and many others. Mixtures of such catalysts are also suitable in the polymerization process of the invention. Radiation polymerization can be used too, e.g., such high-energy radiation sources as X-rays, γ-rays, neutrons and the like can be used to initiate polymerization.

The polymerization can be carried out at a temperature within the range from 0° C. to 100° C. with optimum temperatures varying with the particular $C_2$—$C_4$ olefin employed. Preferred temperatures lie for the most part in the range from 40° C. to 80° C. Pressure may vary from atmospheric to about 600 p.s.i.g. or higher depending upon the particular olefin used.

A less preferred method of forming the new cross-linked olefin-maleic anhydride interpolymers is to add the cross-linking diallyl ether to the copolymer and carry out the cross-linking as a separate chemical reaction or polymerization step.

At the completion of the polymerization reaction, the heteropolymer is recovered from the organic solvent by any suitable means. While the interpolymers may be used in the anhydride form, they are more commonly employed as viscosity control agents in the form of their alkali metal or ammonium salts which form dilute swollen gels or dispersions in aqueous medium. This conversion is generally effected by solution in the appropriate aqueous hydroxide. Alkali metal or ammonium salts of the interpolymers such as sodium, potassium, lithium, rubidium and caesium salts may be obtained by reacting the interpolymers with the stoichiometric amount of the corresponding hydroxide. Partial salts may, of course, be produced by using less than the quantity of alkali required to effect complete conversion of the carboxyl groups. When polymeric anhydrides are dissolved using ammonia an appreciable amount of amide groups are formed resulting in mixed ammonium-amide polymeric salts.

The following specific examples, which are intended as illustrative only, will more clearly demonstrate the preparation of the hydrolysis-resistant interpolymers of maleic anhydride and $C_2$—$C_4$ olefins using diallyl ether as the cross-linking agent. All parts given are by weight.

*Example 1*

A one-gallon autoclave fitted with a paddle stirrer and pressure control means served as the polymerization reactor. After it had been completely dried and freed of air, a mixture of 181.5 parts of maleic anhydride dissolved in 2100 parts of benzene was charged to the reactor and heated to a temperature of about 70° C. To this solution were added 5.73 parts of benzoyl peroxide and 2.36 parts of diallyl ether. The reactor was then charged with sufficient ethylene to give a pressure at the reaction temperature (70° C.) of approximately 600 p.s.i.g. The contents of the reactor were continuously agitated during the addition of the ethylene and throughout the entire reaction period. Additional ethylene was charged periodically to maintain the pressure at 600 p.s.i.g. The reaction was continued until the samples withdrawn at intervals and titrated with sodium hydroxide indicated that 98+% of the anhydride had been reacted (7 hr.). Unreacted ethylene was vented from the reactor, the reaction mixture was cooled and filtered, and the separated interpolymer was washed with benzene and dried.

A sample of the polymer was added to sufficient water containing ammonium hydroxide to make up a 1% concentration of the polymer in water, sufficient ammonium hydroxide having been added to neutralize the interpolymer and to form substantially the diammonium salt of the polymer. The viscosity of the resulting gel was determined with a Brookfield viscosimeter using a number 4 spindle at 6 r.p.m. and found to be 2500 centipoises at room temperature (about 25° C.).

*Example 2*

The polymerization run of Example 1 was repeated in a substantially identical manner except that enough diallyl ether was added to bring the concentration of this reactant up from the 1.0% by weight in that example to 3.0% by weight of the total reaction mixture.

In a similar manner to that described in Example 1, a 1% solution of the ammonium salt in water was prepared and its viscosity determined with a Brookfield viscosimeter was found to be ∼1200 centipoises.

*Example 3*

In the manner of Example 1, 523 parts of maleic anhydride dissolved in 2965 parts of ethylene dichloride were copolymerized with ethylene in the presence of 14.3 parts of isopropylperoxydicarbonate as catalyst at a pressure of about of about 450 p.s.i.g. and a temperature of 50° C. over a reaction period of approximately 2 hours during which 98.8% conversion of the anhydride to polymer was effected. The copolymer was isolated by filtration from the cooled mixture and dried under vacuum for 16 hr. at about 110° C. The specific viscosity of this copolymer as determined on a 1% solution in dimethylformamide at 25° C. was 0.64. The viscosity of a 1% dispersion of the diammonium salt form of this copolymer in water as determined with a number 1 spindle on a Brookfield viscosimeter at 6 r.p.m. was 12 centipoises.

*Example 4*

The experiment of Example 3 was repeated with the exception that 6.84 parts of diallyl ether (representing about 1% by weight of the total reaction mixture) was added in the polymerization recipe. The interpolymer was recovered and a 1% dispersion of it in the form of its diammonium salt was prepared. An aqueous gal was obtained having a viscosity of 1000 centipoises as determined with a Brookfield viscosimeter using the No. 4 spindle at 6 r.p.m. at room temperature. A specific viscosity determination using 1% of the polymer product in dimethyl formamide could not be made because of the formation of an insoluble gel in this solvent.

*Example 5*

Using the apparatus and procedure of Example 1, 259 parts of maleic anhydride dissolved in 2100 parts of benzene were copolymerized with propylene in the presence of 8.3 parts of benzoyl peroxide initiator and 19.47 parts of diallyl ether at a pressure of about 80 p.s.i.g. and a temperature of 80° C. over a period of about 4 hours. The polymer product obtained forms an insoluble gel at 1% concentration in dimethyl formamide so no specific viscosity determination can be made.

However, the interpolymer recovered was converted to the diammonium salt form and this salt in 1% concentration was dispersed in water for determination of its viscosity at 25° C. with a Brookfield viscosimeter using the No. 4 spindle at 6 r.p.m. The viscosity was 400 centipoises.

*Example 6*

Viscosity determinations were made on 1% dispersions of the salt form of cross-linked interpolymers similar to those of the preceding examples in water after samples of the aqueous gels had been stored over various periods of time at room temperature. A Brookfield viscosimeter was employed using a No. 2 spindle at 6 r.p.m. at 25° C. Results are tabulated below opposite the original values obtained prior to the storage period by the same technique. Included for comparative purposes are similar data obtained on an aqueous dispersion of the ammonium salt form of an interpolymer of ethylene, maleic anhydride and triallyl cyanurate, the latter compound being a well known cross-linking agent. This is identified as Sample No. 4.

| Sample No. | Viscosity | | | |
|---|---|---|---|---|
| | Original | After 24 hr | After 48 hr | After 72 hr |
| 1 | 435 | 335 | 320 | 300 |
| 2 | 650 | 505 | 480 | 465 |
| 3 | 210 | 150 | 150 | 145 |
| 4 | 1,225 | 570 | 175 | 50 |

*Example 7*

The extent of cross-linking of the polymers of Example 1 and Example 5 was determined by means of extraction with acetone. Linear copolymers of $C_2$—$C_4$ olefins and maleic anhydride are soluble in acetone whereas the cross-linked interpolymer of these monomers with diallyl ether is not. A known weight of the dried interpolymer (~1 g.) was weighed into a Soxhlet thimble and extracted for 24 hours with boiling C.P. acetone. The thimble and residue were then dried in a vacuum oven at 110° C.–115° C. and 1 mm. for 16 hours and reweighed. The percent extractable material was then calculated from the weight loss. Results are tabulated below together with the value obtained for the linear copolymer of Example 4 determined simultaneously as a control sample.

Percent acetone solubles
Example 1 _____ 45.3
Example 4 _____ 61.5
Example 3 _____ 83.9

*Example 8*

Following a procedure analogous to that of Example 1, 300 parts of maleic anhydride and 1700 parts of ethylene dichloride were charged to an autoclave which had been dried and freed of air. The mixture was deoxygenated and heated to a temperature of approximately 70° C. after which 8 parts of benzoyl peroxide dissolved in 100 parts of ethylene dichloride and 4 parts of diallyl ether contained in 100 parts of ethylene dichloride were added to it. The autoclave was then charged with ethylene up to a pressure of 450 p.s.i.g. while the temperature was maintained at about 70° C. Additional ethylene was charged at intervals to maintain the pressure at 450 p.s.i.g. and continuous agitation was provided within the reactor throughout the reaction period. Samples of the reaction mixture were analyzed periodically. When 98.6% of the maleic anhydride had been reacted (7 hr.), unreacted ethylene was vented from the reactor and the reaction mixture was transferred to an appropriate vessel for conversion of the ethylene-maleic anhydride polymer to the sodium salt form.

The polymer slurry was heated to a temperature of about 70° C. and 50 parts of 50% sodium hydroxide was added to it at a rate of about 20 parts every 10 minutes. The temperature during this addition was controlled between 70° C.–75° C. Then solid sodium hydroxide was added at a rate of about 50 parts every 30 minutes until 130 parts of solid caustic had been added. When all the caustic had been added, the temperature of the mixture was raised to 80° C.–82° C. and the slurry was kept at this temperature for about 2 hours. Any thickening of the mixture was avoided by the addition of more of the ethylene dichloride solvent medium. After cooling, the mixture was centrifuged to recover the solid interpolymer which was then thoroughly dried.

Samples of this sodium salt of the interpolymer of ethylene and maleic anhydride cross-linked with diallyl ether were tested as clay beneficiating agents on typical Wyoming bentonite and attapulgite clays used in the preparation of drilling muds. The yield of 15-centipoise mud per ton of clay from these particular clays was significantly increased by the addition of the interpolymer. Results of the tests tabulated below clearly demonstrate this beneficiating effect.

| Conc.—Interpolymer, lb./ton: | Yield—Bentonite (Fresh Water), bbl./ton [1] | Yield—Attapulgite (Salt Water), bbl./ton [1] |
|---|---|---|
| 0.0 | 91 | 74 |
| 0.5 | 136 | 93 |
| 1.0 | 163 | 99 |
| 1.5 | 166 | 107 |
| 2.0 | 142 | 112 |

[1] Barrels of 15 cps. mud/ton of clay

What is claimed is:
1. A resinous cross-linked interpolymer of substantially equimolar portions of maleic anhydride and a monoolefin having from 2 to 4 carbon atoms and diallyl ether in an amount in the range from about 0.1% to about 5.0% by weight based on the reacting monomers.

2. A resinous cross-linked interpolymer of equimolar portions of maleic anhydride and ethylene and from about 0.1% to about 3.0% by weight based on the reacting monomers of diallyl ether.

3. A resinous cross-linked interpolymer of equimolar portions of maleic anhydride and propylene and from about 0.1% to about 5.0% by weight based on the reacting monomers of diallyl ether.

4. A salt chosen from the group consisting of the alkali metal and ammonium salts of a resinous cross-linked interpolymer of substantially equimolar portions of maleic anhydride and a monoolefin having from 2 to 4 carbon atoms and diallyl ether in an amount in the range from about 0.1% to about 5.0% by weight based on the total reacting monomers.

5. A salt chosen from the group consisting of the alkali metal and ammonium salts of a resinous cross-linked interpolymer of equimolar portions of maleic anhydride and ethylene and from about 0.1% to about 3% by weight based on the reacting monomers of diallyl ether.

6. A salt chosen from the group consisting of the alkali metal and ammonium salts of a resinous cross-linked interpolymer of equimolar portions of maleic anhydride and propylene and from about 0.1% to about 5.0% by weight based on the reacting monomers of diallyl ether.

References Cited in the file of this patent
UNITED STATES PATENTS

| 2,621,169 | Robinette et al. | Dec. 9, 1952 |
| 2,798,053 | Brown | July 2, 1957 |
| 2,923,692 | Ackerman et al. | Feb. 2, 1960 |